W. H. JOLLIFFE & T. C. SCHNEIDER.
Hose and Pipe Coupling.

No. 196,807.  Patented Nov. 6, 1877.

WITNESSES

Wm Meriwether
Chas. E. Lewis

INVENTORS

Wm H. Jolliffe
Theo. C. Schneider
By their Atty
Chas. B. Mann

UNITED STATES PATENT OFFICE.

WILLIAM H. JOLLIFFE AND THEODORE C. SCHNEIDER, OF BALTIMORE, MD.

IMPROVEMENT IN HOSE AND PIPE COUPLINGS.

Specification forming part of Letters Patent No. 196,807, dated November 6, 1877; application filed August 25, 1877.

*To all whom it may concern:*

Be it known that we, WILLIAM H. JOLLIFFE and THEODORE C. SCHNEIDER, of Baltimore, in the county of Baltimore and State of Maryland, have invented a new and useful Improvement in Hose and Pipe Couplings, which is fully set forth in the following specification and accompanying drawing, in which—

Figure 1:
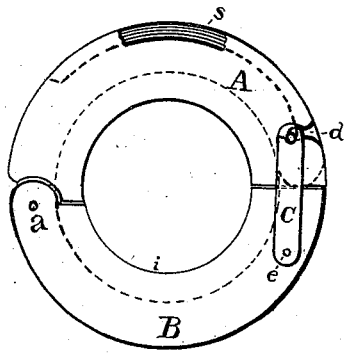
Figure 2:
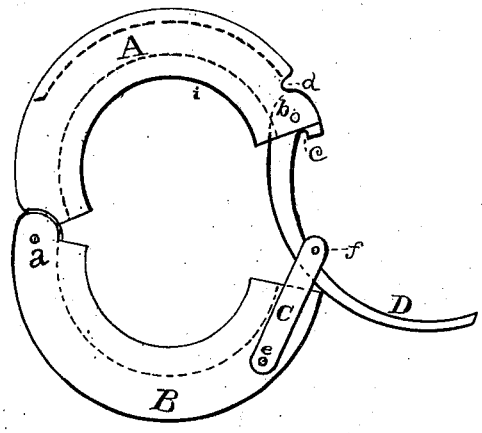
Figure 3:
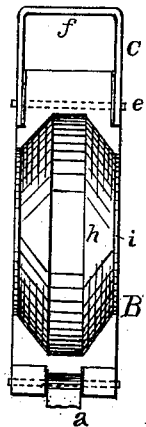
Figure 4:
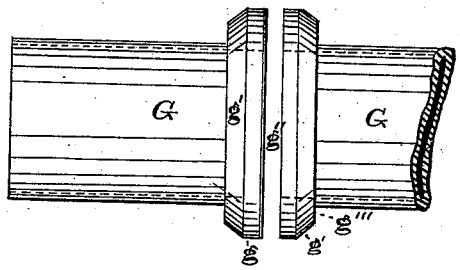

Figure 1 is a side view of our coupling. Fig. 2 is a side view of same, showing the coupling open. Fig. 3 is a view of the inner side of one part of the coupling, showing the yoke. Fig. 4 is a view of the end pieces of hose or pipe to be coupled.

The object of our invention is to provide an improved hose or pipe coupling for connecting the hose of air or steam brakes on railroad-cars, hose used by fire-engines, and for use with gas, water, or steam pipes, where temporary or removable couplings are desired.

Referring to the drawings, the semi-annular clamping parts A B represent the coupling, the two parts being jointed or hinged at $a$. The part A has a groove, $s$, formed on its rim or periphery, (see Fig. 1,) part of rim broken away, and in a slot at the end the arc-shaped lever D is jointed or attached by the pin $b$. A shoulder or notch, $c$, is formed on the lever, and on each side of the peripheral groove of clamp A are notches $d$, so located that when the lever D rests in the groove $s$ the notches $e$ and $d$ coincide. C represents a yoke attached to the clamp B by the pin $e$. The two semi-annular clamps are locked together by engaging the lever with the yoke, as shown in Fig. 2, and then bringing it to position in the groove $s$, whereby the part $f$ of the yoke, which is made of steel, and spring-tempered, is held firmly in the notches $c$ $d$, as shown in Fig. 1.

The ends of the hose or pipe to be coupled are fitted with end pieces G, which have a flange, $g$. The rear edge $g'$ of the flange is beveled, as shown, to correspond with similar bevels on the interior of the clamping parts. The face $g''$ of the pipe ends is ground to fit the opposing face, so as to make a water-tight joint, and thus, if desired, to dispense with an interposing washer. While our coupling may be thus employed without a washer, we find that a degree of elasticity is afforded by using a washer, which we consider an advantage in compensating for the otherwise rigid nature of the clamp.

The two parts A B constitute an annular clamping-socket, the interior being enlarged, and beveled, as shown at $h$, Fig. 3, to receive the flanges $g$ of the two end pieces of the hose, which, when brought face to face, are inserted in the socket and the clamps brought together and locked by the lever and yoke, as above described.

It will be noticed that the interior bevel of the clamps, when brought to position on the end pieces, forms, with the straight part $g'''$ of the rear side of the flange of end pieces, an annular space, whereby the thin edge $i$ of the clamps is relieved of all strain, the pressure being brought on the thicker part of the bevel, where the clamp has greater strength.

Having described our invention, we claim and desire to secure by Letters Patent—

1. The semi-annular clamping parts A B, hinged together and locked by the lever D engaging with the yoke C, whereby the part $f$ of the yoke is held in the coinciding notches on the lever and clamp, as shown and described.

2. The end pieces G for hose-coupling, having a flange the rear edge $g'$ of which is beveled and the rear part $g'''$ straight, in combination with the hinged clamping-socket interiorly beveled to correspond with the edge $g'$ of the flanges, whereby an annular space is left around the rear part $g'''$ of the flange, as and for the purpose specified.

WM. H. JOLLIFFE.
THEODORE C. SCHNEIDER.

Witnesses:
CHAS. B. MANN,
CHAS. E. LEWIS.